R. Chauncey,
Boot & Shoe Burnisher.
No. 112,548.  Patented Mar. 14, 1871.

Witnesses.
Wm. T. Allen
H. Derrick

Inventor.
R. Chauncey
per F.A. Morley
Atty.

United States Patent Office.

ROBERT CHAUNCEY. OF SYRACUSE, NEW YORK.

Letters Patent No. 112,548, dated March 14, 1871.

IMPROVEMENT IN BURNISHERS FOR BOOTS AND SHOES.

The Schedule referred to in these Letters Patent and making part of the same.

*To all whom it may concern:*

Be it known that I, ROBERT CHAUNCEY, of Syracuse, in the county of Onondaga and State of New York, have invented a new and useful Improvement in Burnishers for Boots and Shoes; and I do hereby declare that the following is a full, clear, and exact description thereof, which will enable others to make and use the same, reference being had to the accompanying drawing forming part of this specification, in which—

Figure 1:
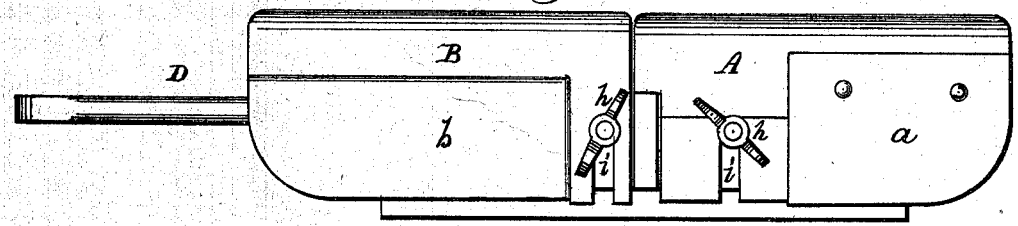
Figure 2:
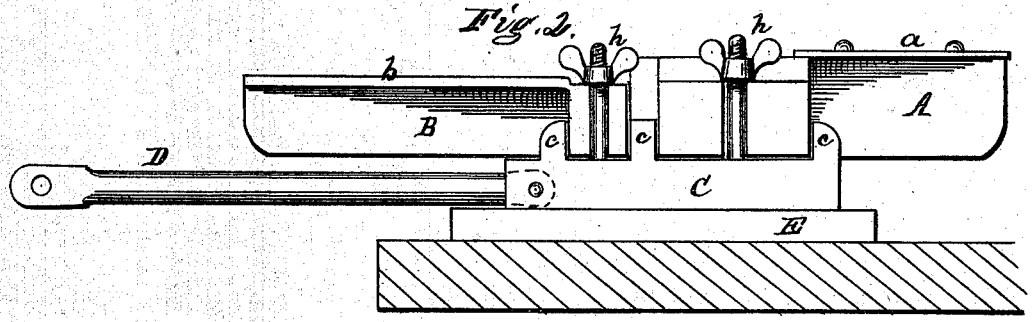
Figure 3:
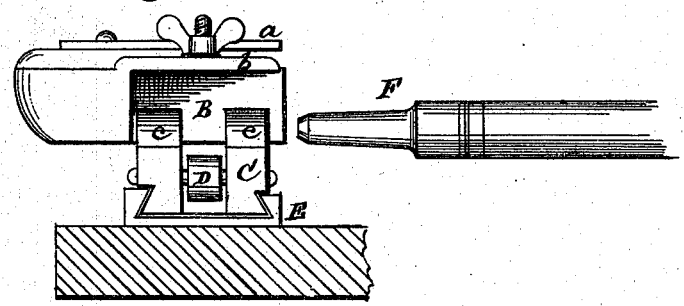

Figure 1 is a plan view;
Figure 2 is a side view; and
Figure 3 is an end view.

Similar letters of reference indicate like parts in the several figures.

In the accompanying drawing—

A is a soap-stone burnisher for doing the roughest part of the work; and

B is a metallic burnisher for finishing.

Both burnishers are placed in line, as shown in fig. 1, and are mounted on a carriage, C, fig. 2, that receives a reciprocating motion from the pitman D, and slides in a dovetail groove in the bed-plate E, as seen in end view, fig. 3.

The body of each burnisher is L-shaped, and the concave angle of each is covered over with a thin cover, $a\ b$, and by this means cavities are formed in the burnishers for receiving a heating jet or gas-flame, by which the burnishers are kept constantly hot.

F shows a gas-burner, which supplies the flame for the cavity at B, fig. 3.

The carriage C has lugs $c\ c\ .c$, which steady the burnishers in position on the carriage, and is provided with screws and thumb-nuts $h\ h$.

Each burnisher has a slot, $i$, that allows its screw to pass into near its center by slackening the nut, and without having to remove it entirely, and by this means a single screw, acting in conjunction with the lugs $c$, holds the burnisher in a secure and simple manner.

Having thus described my invention,

What I claim, and desire to secure by Letters Patent, is—

The burnishers A B with covers $a\ b$, for forming the heating cavities, the clamping devices $h\ i\ c$, carriage C D, and bed E, all constructed and operated as and for the purpose specified.

The above specification of my invention signed by me this 14th day of January, 1871.

ROBERT CHAUNCEY.

Witnesses:
WM. T. ALLEN,
F. A. MORLEY.